(12) United States Patent
Imai et al.

(10) Patent No.: US 9,828,511 B2
(45) Date of Patent: Nov. 28, 2017

(54) IMAGE-RECORDING METHOD AND INK SET

(71) Applicant: CANON KABUSHIKI KAISHA, Tokyo (JP)

(72) Inventors: Takashi Imai, Kawasaki (JP); Shinichi Sakurada, Tokyo (JP); Mamiko Kaji, Kawasaki (JP); Yuichiro Kanasugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 14/481,621

(22) Filed: Sep. 9, 2014

(65) Prior Publication Data

US 2015/0070435 A1 Mar. 12, 2015

(30) Foreign Application Priority Data

Sep. 11, 2013 (JP) .................................. 2013-187820

(51) Int. Cl.
  *C09D 11/107* (2014.01)
  *C09D 11/40* (2014.01)
  *C09D 11/322* (2014.01)
  *C09D 11/38* (2014.01)

(52) U.S. Cl.
  CPC .......... *C09D 11/107* (2013.01); *C09D 11/322* (2013.01); *C09D 11/38* (2013.01); *C09D 11/40* (2013.01)

(58) Field of Classification Search
  None
  See application file for complete search history.

(56) References Cited

U.S. PATENT DOCUMENTS

| | | | |
|---|---|---|---|
| 2007/0048505 A1* | 3/2007 | Shimada | B44C 1/10 428/195.1 |
| 2008/0134935 A1* | 6/2008 | Kunimine | C09D 11/322 106/31.85 |
| 2010/0086690 A1* | 4/2010 | Aoki | B41M 7/00 427/256 |
| 2012/0306964 A1* | 12/2012 | Nakajima | B41J 2/165 347/22 |
| 2013/0176369 A1* | 7/2013 | Gotou | B41J 2/2107 347/100 |
| 2014/0364548 A1* | 12/2014 | Everhardus | C09D 11/322 524/166 |

FOREIGN PATENT DOCUMENTS

| | | |
|---|---|---|
| JP | 2010-31267 A | 2/2010 |
| JP | 2010-241049 A | 10/2010 |
| JP | 2011-63001 A | 3/2011 |

* cited by examiner

*Primary Examiner* — Laura Powers
(74) *Attorney, Agent, or Firm* — Canon U.S.A.Inc., IP Division

(57) ABSTRACT

An image-recording method includes applying an ink to a recording medium and applying a liquid composition to the recording medium. The ink contains a pigment, and the liquid composition disturbs the dispersion state of the pigment in the ink. The applied liquid composition at least partially overlaps the area where the ink is applied. The ink contains a resin particle, a water-soluble resin, and at least one surfactant selected from fluorinated surfactants and silicone surfactants. The surfactant content of the ink is 2% by mass or more based on the total mass of the ink, and the mass ratio of the water-soluble resin content to the surfactant content of the ink is 0.3 or more and 3.0 or less.

20 Claims, 1 Drawing Sheet

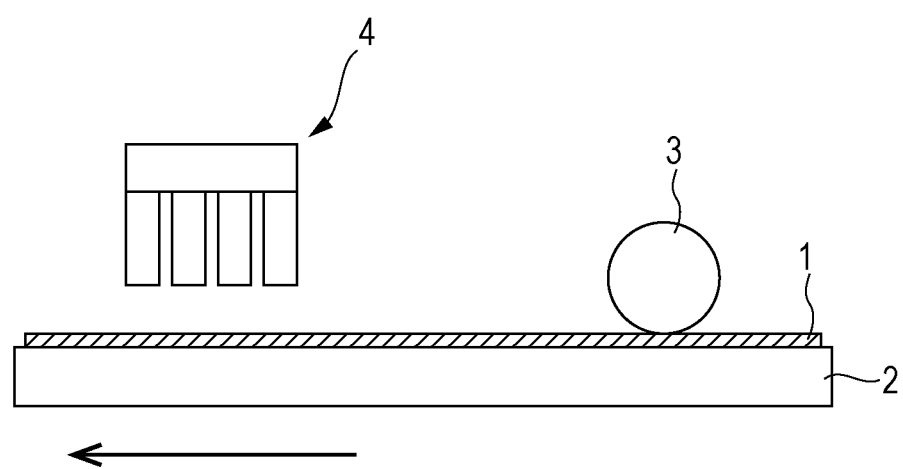

IMAGE-RECORDING METHOD AND INK SET

BACKGROUND OF THE INVENTION

Field of the Invention

The present invention relates to an image-recording method and an ink set.

Description of the Related Art

In recent years, a method in which an ink containing a pigment and a liquid reactant are applied to a recording medium to record an image (hereinafter referred to as a "two-liquid reaction system") has been proposed as an image-recording method that allows for high-speed recording of a high-quality image. The reactant used in this method is a liquid composition that disturbs the dispersion state of the pigment in the ink and thickens the ink upon contact with the ink.

In a two-liquid reaction system, in which an image is recorded rapidly, a situation can occur where the pigment as a coloring material moves after recording (after an image has been formed), leaving colorless areas and affecting the quality of the image (hereinafter referred to as "image movement"). As a way to prevent image movement, Japanese Patent Laid-Open Nos. 2010-31267, 2010-241049, and 2011-63001 propose methods in which an image is recorded using an ink containing a pigment, a resin particle, and a surfactant and a reactant containing a coagulant that makes a component of the ink aggregate.

SUMMARY OF THE INVENTION

An aspect of the invention provides an image-recording method that includes applying an ink to a recording medium and applying a liquid composition to the recording medium. The ink contains a pigment, and the liquid composition disturbs the dispersion state of the pigment in the ink. The applied liquid composition at least partially overlaps the area where the ink is applied. The ink contains a resin particle, a water-soluble resin, and at least one surfactant selected from fluorinated surfactants and silicone surfactants. The surfactant content of the ink is 2% by mass or more based on the total mass of the ink, and the mass ratio of the water-soluble resin content to the surfactant content of the ink is 0.3 or more and 3.0 or less.

Further features of the present invention will become apparent from the following description of exemplary embodiments with reference to the attached drawings.

BRIEF DESCRIPTION OF THE DRAWINGS

The FIGURE is a schematic diagram that illustrates the structure of the image-recording apparatus used in Examples.

DESCRIPTION OF THE EMBODIMENTS

After studies on the technologies proposed in Japanese Patent Laid-Open Nos. 2010-31267, 2010-241049, and 2011-63001, however, the inventors found that recording an image using these technologies results in inconsistent dot diameters and image movement, particularly when a large amount of ink is applied rapidly.

An aspect of the invention therefore provides an image-recording method that allows a high-quality image to be recorded without variations in dot diameter or image movement even when a large amount of ink is applied rapidly.

Another aspect of the invention provides an ink set that can be used in this image-recording method.

Forming an image using a two-liquid reaction system, particularly at a high speed, requires that the ink has aggregation quickness. The term "aggregation quickness" means that the ink quickly thickens and aggregates. With inks that lack aggregation quickness, interference can occur where they overlap. Interference between two inks that occurs where they overlap causes the second ink to have a smaller or larger dot diameter in the areas where it is applied over the first ink than in the other areas. The resulting inconsistency in dot diameter makes the image-recording process out of control. Inks having aggregation quickness do not cause such a problem.

After extensive research, however, the inventors found that increasing the aggregation quickness of ink ends up with image movement as a result of the coloring material moving on the recording medium or between ink layers after image formation. A cause of this type of image movement can be the shrinkage of the ink in volume due to aggregation. Forming a high-quality image at a high speed therefore requires that the ink have aggregation quickness and that image movement be prevented.

Further research by the inventors found that the use a water-soluble resin and a certain surfactant in certain proportions prevents image movement without affecting the aggregation quickness of the ink. This appears to be a result of the coexistence of certain proportions of the water-soluble resin as a material that thickens the ink upon contact with the surfactant and the surfactant as a material that is unlikely to interact with the water-soluble resin and is easily taken in the aggregate of the water-soluble resin.

Image-recording Method

An image-recording method according to an embodiment of the invention includes applying an ink to a recording medium and applying a liquid composition to the recording medium. The ink contains a pigment, and the liquid composition disturbs the dispersion state of the pigment in the ink. The applied liquid composition at least partially overlaps the area where the ink is applied. In an image-recording method according to an embodiment of the invention, therefore, an image is recorded through the contact of an ink and a liquid composition on a recording medium using an ink set described hereinafter including the ink and the liquid composition. The ink contains a resin particle, a water-soluble resin, and at least one surfactant selected from fluorinated surfactants and silicone surfactants. The surfactant content of the ink is 2% by mass or more based on the total mass of the ink, and the mass ratio of the water-soluble resin content to the surfactant content of the ink is 0.3 or more and 3.0 or less.

The ink can be applied to the recording medium through, for example, ejection from an ink jet recording head. The liquid composition can be applied to the recording medium through, for example, ejection from an ink jet recording head as with the ink or the use of a coating device, such as a roller.

An image-recording method according to an embodiment of the invention allows a high-quality image to be recorded even when large amounts of inks are applied rapidly. More specifically, the difference in the time of application between the inks can be 0.2 seconds or less, preferably 0.05 seconds or less. The amount of an ink applied to the recording medium can be 15 $g/m^2$ or more, preferably 20 $g/m^2$ or more.

Examples of apparatus that can be used in an image-recording method according to an embodiment of the invention include ink jet recording apparatus and systems composed of ink jet recording apparatus and a coating mechanism. Examples of recording heads that ink jet recording apparatus can have include ones that eject a liquid using mechanical energy and ones that eject a liquid using thermal energy. An ink jet recording apparatus having a recording head that ejects a liquid using thermal energy may be used in an image-recording method according to an embodiment of the invention.

The appropriate amount of the liquid composition applied to the recording medium depends on factors such as the composition of the ink with which the liquid composition reacts. More specifically, the amount of the liquid composition applied to the recording medium can be 0.3 g/m² or more and 10.0 g/m² or less, preferably 0.8 g/m² or more and 6.0 g/m² or less, for the sake of the quality of the recorded image such as uniformity and fixation. If the liquid composition is applied only to a part of the recording surface of the recording medium, the amount (g/m²) of the liquid composition applied to the recording medium is determined assuming that the liquid composition was applied to the entire recording surface of the recording medium. The determined amount of application of the liquid composition may fall within the above range.

When a roller or a similar device is used to apply the liquid composition to the recording medium, the image-recording process may be such that the liquid composition is applied to the recording medium first and then the ink, with the liquid composition being more viscous than the ink. Ensuring that the liquid composition is more viscous than the ink helps the liquid composition to stay near the surface of the recording medium, thereby helping the liquid composition and the ink to effectively react. This means that the dispersion state of the pigment in the ink would be effectively disturbed even with a reduced amount of the liquid composition. Reducing the amount of the liquid composition enhances the fixation and other characteristics of the image.

After the reaction between the ink and the liquid composition, the pigment in the ink stays near the surface of the recording medium while the other components of the ink such as an aqueous medium quickly penetrate into the recording medium in the direction of depth. Ensuring that the ink is less viscous than the liquid composition and thereby allowing the ink to quickly separate into a liquid and a solid after reacting with the liquid composition improves the fixation and other characteristics of the image. More specifically, the viscosity parameters of the liquid composition and the ink can be 3 mPa·s or more and 10 Pa·s or less, preferably 10 mPa·s or more and 1 Pa·s or less, and 1 mPa·s or more and 15 mPa·s or less, respectively, when a roller or a similar device is used to apply the liquid composition to the recording medium.

When both of the liquid composition and the ink are applied to the recording medium through ejection from an ink jet recording head, either can be applied to the recording medium first. Applying the liquid composition to the recording medium first and then applying the ink to the recording medium to record the image may be beneficial for the sake of the advantages of certain aspects of the invention. The viscosity of the liquid composition and that of the ink can both be 1 mPa·s or more and 15 mPa·s or less, preferably 1 mPa·s or more and 5 mPa·s or less, for the sake of ejection from an ink jet recording head. The surface tension of the liquid composition and that of the ink can both be 15 mN/m or more and 50 mN/m or less.

Making the surface tension of the liquid composition greater than that of the ink without affecting the ejection of the liquid composition from a recording head and thereby preventing the liquid composition from spreading out of the area where the ink is applied helps the liquid composition and the ink to efficiently react on the recording medium.

Ink Set

The following describes an ink set according to an embodiment of the invention that can be used in the above image-recording method. An ink set according to an embodiment of the invention includes an ink containing a pigment and a liquid composition configured to disturb the dispersion state of the pigment in the ink. The ink contains a resin particle, a water-soluble resin, and at least one surfactant selected from fluorinated surfactants and silicone surfactants. The following are detailed descriptions of an ink and a liquid composition used in an ink set according to an embodiment of the invention.

Ink

The ink contains a pigment and also contains a resin particle, a water-soluble resin, and a surfactant. The following describes the individual components of the ink.

Pigment

The pigment can be of any kind, such as a known black pigment or organic pigment. Specific examples include pigments identified with C.I. (color index) numbers. Carbon black can be used as a black pigment. The pigment content of the ink can be 0.2% by mass or more and 15.0% by mass or less, preferably 0.6% by mass or more and 10.0% by mass or less, based on the total mass of the ink.

Resin Particle

The ink contains a resin particle for improved quality of the recorded image. The resin particle can be of any kind, such as a particle of a known suitable resin. Examples of resins from which the resin particle can be made include homopolymers such as polyolefins, polystyrene, polyurethane, polyesters, polyethers, polyurea, polyamides, polyvinyl alcohol, poly(meth)acrylic acid and their salts, polyalkyl (meth)acrylates and polydienes as well as copolymers that are combinations of two or more of these. A resin can have a weight-average molecular weight of 1,000 or more and 2,000,000 or less. The resin particle content of the ink can be 1% by mass or more and 50% by mass or less, preferably 2% by mass or more and 30% by mass or less, based on the total mass of the ink.

A resin particle may be used in the form of a resin particle dispersion that contains an appropriate dispersion medium and the resin particle dispersed in this dispersion medium. It is also possible to use a self-dispersion resin particle dispersion, which is a resin particle dispersion that contains a dispersion medium and a particle of a resin obtained through polymerizing a monomer having a dissociative group or copolymerizing two or more such monomers. Specific examples of dissociative groups include carboxy, sulfonic acid, and phosphoric acid groups. Specific examples of monomers having a dissociative group include acrylic acid and methacrylic acid. It is also possible to use an emulsification-dispersion resin particle dispersion, which is a resin particle dispersion obtained through dispersing a resin particle in a dispersion medium using an emulsifier. Any known surfactant can be used as an emulsifier for this purpose. Examples include nonionic surfactants and a surfactant having the same electric charge as that of the resin from which the resin particle is made. The volume-average particle diameter of a resin particle in a resin particle dispersion can be 10 nm or more and 1,000 nm or less, preferably 50 nm or more and 500 nm or less. The volume-average particle diameter of a resin particle can be measured using, for example, "Nanotrac UPA-EX150" (Nikkiso Co., Ltd.).

Water-soluble Resin

The water-soluble resin is dissolved in the ink and thickens the ink upon contact with the liquid composition. A water-soluble resin may contain a unit derived from a hydrophobic monomer and a unit derived from a hydrophilic monomer. Specific examples of hydrophobic monomers include styrene, styrene derivatives, alkyl (meth)acrylates, and benzyl (meth)acrylates. Specific examples of hydrophilic monomers include acrylic acid, methacrylic acid, and maleic acid. A water-soluble resin may contain a unit derived from an unsaturated carboxylic acid.

A water-soluble resin may be added to the ink in the form of a salt obtained through preparing an aqueous solution containing a polymer of any of the monomers listed above and adjusting the pH of this aqueous solution to 7 to 10 with a pH adjuster. Specific examples of pH adjusters include the following: organic amines such as monoethanolamine, diethanolamine, and triethanolamine; and inorganic alkaline chemicals such as alkali metal hydroxides, e.g., sodium hydroxide, lithium hydroxide, and potassium hydroxide.

The acid value of the water-soluble resin can be 40 mg KOH/g or more and 300 mg KOH/g or less, preferably 40 mg KOH/g or more and 90 mg KOH/g or less for the sake of the quality of the recorded image. The weight-average molecular weight of the water-soluble resin can be in the range of 4,000 to 20,000.

The water-soluble resin content of the ink can be 1% by mass or more and 10% by mass or less based on the total mass of the ink. When a water-soluble resin is used as a dispersant for the pigment, "the water-soluble resin content" includes this dispersant for the pigment and the water-soluble resin. The term "a water-soluble resin" as used herein refers to a resin with a solubility of 1 g/L or more in water at 25° C.

Surfactant

The ink contains at least one of a fluorinated surfactant and a silicone surfactant. A fluorinated surfactant is a surfactant that has a fluorocarbon chain in the molecular structure. A silicone surfactant is a surfactant that has an organosiloxane structure in the molecular structure. These types of surfactants, unlikely to interact with water-soluble resins, make the water-soluble resin quickly aggregate after reacting with the liquid composition. These types of surfactants also effectively reduce image movement because they are easily taken in the aggregates the water-soluble resin forms upon contact with the liquid composition. Specific examples of surfactants of these types include those available under the following trade names: Zonyl FSO-100 (Du Pont), MEGAFACE F-444 (DIC), BYK-349 (BYK Chemie), BYK-333 (BYK Chemie), and BYK-3455 (BYK Chemie).

A side-chain polyether-modified silicone surfactant represented by general formula (1) can also be used:

The surfactant content of the ink is 2% by mass or more, preferably 3% by mass or more and 8% by mass or less, based on the total mass of the ink. The mass ratio of the water-soluble resin content to the surfactant content of the ink is 0.3 or more and 3.0 or less, preferably 0.5 or more and 2.5 or less. The ink may also contain any other surfactant for adjusting the surface tension of the ink or any other purpose.

Pigment Dispersant

The ink may also contain a dispersant for the pigment. All known dispersants for ink jet inks can be used. It is possible to use a water-soluble dispersant that has both hydrophilic and hydrophobic moieties in the structure, in particular, a dispersant made from a resin that has a unit derived from a hydrophilic monomer and a unit derived from a hydrophobic monomer (a resin dispersant). All known hydrophilic and hydrophobic monomers can be used in such a dispersant. Specific examples of hydrophobic monomers include styrene, styrene derivatives, alkyl (meth)acrylates, and benzyl (meth)acrylates. Specific examples of hydrophilic monomers include acrylic acid, methacrylic acid, and maleic acid.

The acid value of a resin dispersant can be 50 mg KOH/g or more and 550 mg KOH/g or less. The weight-average molecular weight of a resin dispersant can be 1,000 or more and 50,000.

The mass ratio of the pigment content to the dispersant content of the ink can be 1:0.1 to 1:3 (pigment:dispersant). It is also possible to use a self-dispersion pigment, i.e., a dispersible pigment obtained through a surface modification of a particulate pigment, rather than using a resin dispersant or any other dispersant.

Aqueous Medium

The ink may contain an aqueous medium that is water or a mixture of water and a water-soluble organic solvent. All water-soluble solvents commonly used in inks can be used. Specific examples of water-soluble organic solvents include glycerol, ethanol, methanol, 2-propanol, polyethylene glycol, and 2-pyrrolidone. The water-soluble organic solvent content of the ink can be 2% by mass or more and 50% by mass or less based on the total mass of the ink. Water can be deionized water (ion-exchanged water). The water content of the ink can be 40% by mass or more and 95% by mass or less based on the total mass of the ink.

Liquid Composition

The liquid composition is a component that disturbs the dispersion state of the pigment in the ink. More specifically, the liquid composition acts on at least some of the components of the ink, such as the water-soluble resin, to make them aggregate or get them into any other state that makes the ink more viscous, thereby disturbing the dispersion state of the pigment in the ink. The state that "makes the ink more viscous" includes, in addition to a state that causes the

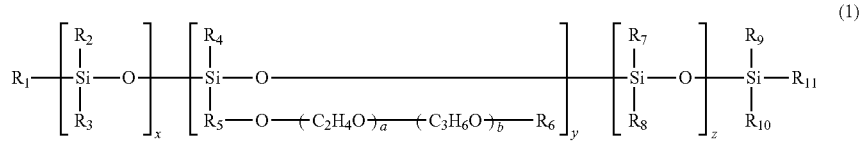

(1)

(where $R_1$ to $R_4$ and $R_6$ to $R_{11}$ independently represent a hydrogen atom or a monovalent organic group, $R_5$ represents a divalent organic group, x, y, and "a" independently represent an integer of 1 or more, and z and b independently represent an integer of 0 or more).

viscosity to increase throughout the ink, a state that results in an increased viscosity localized to a portion of the ink.

The liquid composition contains, for example, an ink-thickening component that makes the ink more viscous. Examples of ink-thickening components include metal ions and polymer coagulants. An ink-thickening component can be a substance that makes the water-soluble resin aggregate by changing the pH of the ink, e.g., an organic acid. This means that the liquid-composition may contain an organic acid.

Specific examples of organic acids include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, oxysuccinic acid, and dioxysuccinic acid.

The liquid composition may contain an aqueous solvent that adjusts the viscosity or fluidity of the liquid composition. Examples of aqueous solvents include water and water-soluble organic solvents. Furthermore, the liquid composition may contain additives. The liquid composition may also contain a surfactant that provides an appropriate surface tension to the liquid composition.

EXAMPLES

The following describes certain aspects of the invention in more detail by providing examples and comparative examples. No aspect of the invention is limited to these examples while within the scope of the invention. The terms "parts" and "%" in the following text are based on mass unless otherwise specified.

Preparation of Pigment Dispersion Liquids

Black Pigment Dispersion Liquid

A mixture of 10 parts of a pigment (carbon black [trade name "Monarch 1100," Cabot]), 15 parts of an aqueous resin solution, and 75 parts of purified water was put into a batch vertical sand mill (Aimex Co., Ltd.), which was then loaded with 200 parts of 0.3-mm zirconia beads. The aqueous resin solution was a solution of a styrene-ethyl acrylate-acrylic acid copolymer (acid value, 150 mg KOH/g; weight-average molecular weight, 8,000) in water (solid content, 20%; neutralized with potassium hydroxide). After 5-hour dispersion with water cooling, the resulting dispersion liquid was centrifuged to remove coarse particles, yielding a black pigment dispersion liquid with a pigment content of 10% and a water-soluble resin content of 3%.

Cyan Pigment Dispersion Liquid

A cyan pigment dispersion liquid was obtained with a pigment concentration of approximately 10% in the same way as the black pigment dispersion liquid above, except that the pigment was C.I. Pigment Blue 15:3.

Magenta Pigment Dispersion Liquid

A magenta pigment dispersion liquid was obtained with a pigment concentration of approximately 10% in the same way as the black pigment dispersion liquid above, except that the pigment was C.I. Pigment Red 122. Preparation of resin particle dispersions A mixture of 18 parts of ethyl methacrylate, 2 parts of 2,2'-azobis-(2-methylbutyronitrile), and 2 parts of n-hexadecane was agitated for 0.5 hours. The resulting mixture was added dropwise to 78 parts of a 6% aqueous solution of an emulsifier (trade name "NIKKOL BC15," Nikko Chemicals), and the obtained mixture was agitate for 0.5 hours. After 3-hour sonication with a sonicator, polymerization was allowed to proceed in a nitrogen atmosphere at 80° C. for 4 hours. The resulting liquid was allowed to cool to room temperature and then filtered, yielding a resin particle dispersion containing a resin particle (resin particle concentration: approximately 30%). The volume-average particle diameter of the resin particle in the resulting resin particle dispersant measured using "Nanotrac UPA-EX150" (Nikkiso Co., Ltd.) was approximately 300 nm. The weight-average molecular weight and the solubility in water (25° C.) of the resin from which the resin particle was made were approximately 250,000 and at least 1 g/L, respectively.

Water-soluble Resins

Water-soluble resins 1 to 3 below were used as water-soluble resins to add to inks.

Water-soluble Resin 1

A solution of a styrene-butyl acrylate-acrylic acid copolymer (acid value, 121 mg KOH/g; weight-average molecular weight, 7,000; solubility in water (25° C.), at least 1 g/L) in water (solid content, 20%; neutralized with potassium hydroxide)

Water-soluble Resin 2

A solution containing 20% 2-pyrrolidone and a styrene-butyl acrylate-acrylic acid copolymer (acid value, 88 mg KOH/g; weight-average molecular weight, 8,000; solubility in water (25° C.), at least 1 g/L) in water (solid content, 20%; neutralized with potassium hydroxide) Water-soluble resin 3

A solution containing 20% 2-pyrrolidone and a styrene-butyl acrylate-acrylic acid copolymer (acid value, 65 mg KOH/g; weight-average molecular weight, 8,300; solubility in water (25° C.), at least 1 g/L) in water (solid content, 20%; neutralized with potassium hydroxide) Preparation of inks Black (BK) Inks 1 to 16

A mixture of the ingredients listed in Tables 1-1 and 1-2 (total: 100 parts) was thoroughly agitated and pressure-filtered through a 3.0-μm Micro Filter (Fujifilm), yielding Bk inks 1 to 16. Table 2 summarizes the surfactants used.

Cyan (C) Inks 1 to 16

C inks 1 to 16 were prepared in the same way as Bk inks 1 to 16 above, except that the "Black pigment dispersion liquid" in Table 1 was replaced with the "cyan pigment dispersion liquid."

Magenta (M) Inks 1 to 16

M inks 1 to 16 were prepared in the same way as Bk inks 1 to 16 above, except that the "Black pigment dispersion liquid" in Table 1 was replaced with the "magenta pigment dispersion liquid."

TABLE 1

(Unit in the upper rows: parts by mass)

| | Bk inks | | | | | | | | |
|---|---|---|---|---|---|---|---|---|---|
| | 1 | 2 | 3 | 4 | 5 | 6 | 7 | 8 | 9 |
| Black pigment dispersion liquid | 20 | 20 | 20 | 20 | 20 | 20 | 20 | 20 | 20 |

TABLE 1-continued (Unit in the upper rows: parts by mass)

| | | | | | | | | | |
|---|---|---|---|---|---|---|---|---|---|
| Resin particle | 40 | 40 | 40 | 40 | 40 | 40 | 40 | 40 | 40 |
| Water-soluble resin 1 | 17 | 17 | 17 | 17 | 17 | | | 9 | 24 |
| Water-soluble resin 2 | | | | | | 17 | 17 | | |
| Water-soluble resin 3 | | | | | | | | | |
| Surfactant 1 | 2 | | | 3 | | 3 | | | |
| Surfactant 2 | | 2 | | | | | | | |
| Surfactant 3 | | | 2 | | 3 | | 3 | 5 | 2 |
| Surfactant 4 | | | | | | | | | |
| Surfactant 5 | | | | | | | | | |
| Surfactant 6 | | | | | | | | | |
| Glycerol | 7 | 7 | 7 | 7 | 7 | 7 | 7 | 7 | 7 |
| Water | Balance | Balance | Balance | Balance | Balance | Balance | Balance | Balance | Balance |
| Water-soluble resin/surfactant (mass ratio) | 2.00 | 2.00 | 2.00 | 1.33 | 1.33 | 1.33 | 1.33 | 0.48 | 2.70 |

| | Bk inks | | | | | | |
|---|---|---|---|---|---|---|---|
| | 10 | 11 | 12 | 13 | 14 | 15 | 16 |
| Black pigment dispersion liquid | 20 | 20 | 20 | 20 | 20 | 20 | 20 |
| Resin particle | 20 | 40 | 40 | 40 | 40 | 40 | 40 |
| Water-soluble resin 1 | 17 | | 17 | 17 | 17 | 17 | 0.5 |
| Water-soluble resin 2 | | | | | | | |
| Water-soluble resin 3 | | 17 | | | | | |
| Surfactant 1 | | | | | | | |
| Surfactant 2 | | | | | | | |
| Surfactant 3 | 3 | 3 | | | | 1 | 3 |
| Surfactant 4 | | | | 3 | | | |
| Surfactant 5 | | | | | 3 | | |
| Surfactant 6 | | | 3 | | | | |
| Glycerol | 7 | 7 | 7 | 7 | 7 | 7 | 7 |
| Water | Balance | Balance | Balance | Balance | Balance | Balance | Balance |
| Water-soluble resin/surfactant (mass ratio) | 1.33 | 1.33 | 1.33 | 1.33 | 1.33 | 4.00 | 0.23 |

TABLE 2

| | Manufacturer | Trade name | Classification |
|---|---|---|---|
| Surfactant 1 | Du Pont | ZonylFSO100 | Fluorinated |
| Surfactant 2 | DIC | MEGAFACE F444 | Fluorinated |
| Surfactant 3 | BYK Chemie | BYK3455 | Silicone-based, side-chain modified with a polyether |
| Surfactant 4 | Kawaken Fine Chemicals | Acetylenol E100 | Acetylene-glycol-based |
| Surfactant 5 | Nikko Chemicals | BC20 | Alkyl-ether-based |
| Surfactant 6 | BYK Chemie | BYC333 | Silicone-based, terminally modified with a polyether |

Liquid Compositions

Liquid compositions 1 and 2 having the following formulae (total: 100 parts) were prepared.

Liquid Composition 1

Glutaric acid, 30 parts

Glycerol, 5 parts

Potassium hydroxide, 5 parts

An acetylene glycol surfactant, 1 part (trade name "Acetylenol E100," Kawaken Fine Chemicals)

Water, balance

Liquid composition 2

Calcium sulfate tetrahydrate, 30 parts

Glycerol, 5 parts

An acetylene glycol surfactant, 1 part (trade name "Acetylenol E100," Kawaken Fine Chemicals)

Water, balance

Image-recording Method Examples 1 to 13 and Comparative Examples 1 to 4

Images were recorded on a recording medium using an image-recording apparatus having the structure illustrated in the FIGURE and the combinations of inks and a liquid composition (ink sets) listed in Table 3. More specifically, the liquid composition was applied to a recording medium 1 on a conveyor stage 2 using a roller 3, and then the C, M, and Bk inks were ejected using an ink jet device 4 to record an image having a predetermined pattern. The nozzle pitch and ejection volume settings of the ink jet device 4 were 1,200 dpi and 4 pL, respectively. "Pearlcoat" (trade name, Mitsubishi Paper Mills) was used as the recording medium 1. The cyan, magenta, and black inks were applied in this order with 50-msec intervals between the inks.

TABLE 3

| | Inks | | | |
|---|---|---|---|---|
| | Black ink | Cyan ink | Magenta ink | Liquid composition |
| Example 1 | Bk ink 1 | C ink 1 | M ink 1 | Liquid composition 1 |
| Example 2 | Bk ink 2 | C ink 2 | M ink 2 | Liquid composition 1 |
| Example 3 | Bk ink 3 | C ink 3 | M ink 3 | Liquid composition 1 |
| Example 4 | Bk ink 4 | C ink 4 | M ink 4 | Liquid composition 1 |
| Example 5 | Bk ink 5 | C ink 5 | M ink 5 | Liquid composition 1 |
| Example 6 | Bk ink 6 | C ink 6 | M ink 6 | Liquid composition 1 |
| Example 7 | Bk ink 7 | C ink 7 | M ink 7 | Liquid composition 1 |
| Example 8 | Bk ink 8 | C ink 8 | M ink 8 | Liquid composition 1 |
| Example 9 | Bk ink 9 | C ink 9 | M ink 9 | Liquid composition 1 |
| Example 10 | Bk ink 7 | C ink 7 | M ink 7 | Liquid composition 2 |
| Example 11 | Bk ink 10 | C ink 10 | M ink 10 | Liquid composition 1 |
| Example 12 | Bk ink 11 | C ink 11 | M ink 11 | Liquid composition 1 |
| Example 13 | Bk ink 12 | C ink 12 | M ink 12 | Liquid composition 1 |
| Comparative Example 1 | Bk ink 13 | C ink 13 | M ink 13 | Liquid composition 1 |
| Comparative Example 2 | Bk ink 14 | C ink 14 | M ink 14 | Liquid composition 1 |
| Comparative Example 3 | Bk ink 15 | C ink 15 | M ink 15 | Liquid composition 1 |
| Comparative Example 4 | Bk ink 16 | C ink 16 | M ink 16 | Liquid composition 1 |

Evaluation

Dot Diameter Variations

The above image-recording method was performed to record a 100%-duty solid image was recorded in a 5 cm×5 cm area using the C ink and then to apply the Bk ink to the area coated with the C ink and to an area not coated with the C ink. "Dot diameter 1" and "dot diameter 2" were measured on the obtained image for evaluation, the former being the diameter of the dots of the Bk ink in the area not coated with the C ink and the latter being that in the area coated with the C ink, and a "dot diameter ratio" was calculated using equation (1). The calculated "dot diameter ratio" was used as a measure of "dot diameter variations" in accordance with the evaluation criteria below. The results of the evaluation are provided in Table 4.

$$\text{Dot diameter ratio} = |100 - \{(\text{Dot diameter 2}/\text{Dot diameter 1}) \times 100\}| \quad (1)$$

Criteria for the Evaluation of Dot Diameter Variations

AA: The dot diameter ratio was less than 5. The image was of very good quality.

A: The dot diameter ratio was 5 or more and less than 10. The image was of good quality.

B: The dot diameter ratio was 10 or more and less than 20. Although with some variation in dot diameter, the quality of the image was practically acceptable.

C: The dot diameter ratio was 20 or more. The intended image was not obtained.

Image Movement

The above image-recording method was performed to record a 300%-duty solid image in a 5 cm×5 cm area using the C, M, and Bk inks. The recorded solid image was observed under a microscope, and "image movement" was evaluated using the evaluation criteria below.

Criteria for the Evaluation of Image Movement

AA: No colorless area. A very good solid image was recorded.

A: The percentage colorless area was 1% or more and less than 5%. A good solid image was record.

B: The percentage colorless area was 5% or more and less than 10%. Although with some colorless area, an acceptably solid image was recorded.

C: So large colorless area that the recorded image was not solid.

TABLE 4

| | Dot diameter variations | Image movement |
|---|---|---|
| Example 1 | A | B |
| Example 2 | A | B |
| Example 3 | A | A |
| Example 4 | A | A |
| Example 5 | A | AA |
| Example 6 | AA | A |
| Example 7 | AA | AA |
| Example 8 | A | AA |
| Example 9 | A | A |
| Example 10 | A | A |
| Example 11 | A | AA |
| Example 12 | AA | AA |
| Example 13 | A | B |
| Comparative Example 1 | A | C |
| Comparative Example 2 | C | A |
| Comparative Example 3 | A | C |
| Comparative Example 4 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-187820, filed Sep. 11, 2013, which is hereby incorporated by reference herein in its entirety.

What is claimed is:

1. An image-recording method comprising applying an ink containing a pigment to a recording medium and applying a liquid composition to the recording medium to at least partially overlap an area where the ink is applied, the liquid composition configured to disturb a dispersion state of the pigment in the ink, wherein
the ink further contains a resin particle, a water-soluble resin, and at least one surfactant selected from fluorinated surfactants and silicone surfactants,
a content of the surfactant in the ink is 2% by mass or more and 8% by mass or less based on a total mass of the ink,
a content of the water soluble resin in the ink is 1% by mass or more and 10% by mass or less based on a total mass of the ink,
a mass ratio of a content of the water-soluble resin in the ink to the content of the surfactant is 0.3 or more and 3.0 or less, and the water-soluble resin contains a unit derived from an unsaturated carboxylic acid and has an acid value of 90 mg KOH/g or less.

2. The image-recording method according to claim 1, wherein the content of the surfactant in the ink is 3% by mass or more based on the total mass of the ink.

3. The image-recording method according to claim 1, wherein the surfactant is represented by general formula (1):

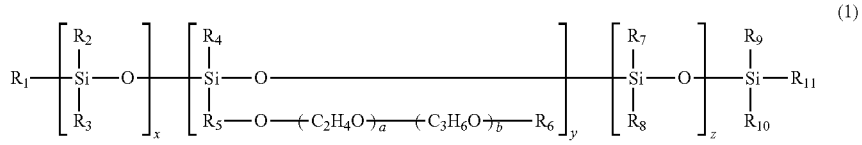

wherein $R_1$ to $R_4$ and $R_6$ to $R_{11}$ independently represent a hydrogen atom or a monovalent organic group, $R_5$ represents a divalent organic group, x, y, and "a" independently represent an integer of 1 or more, and z and b independently represent an integer of 0 or more.

4. The image-recording method according to claim 1, wherein the liquid composition contains an organic acid.

5. An ink set comprising an ink containing a pigment and a liquid composition configured to disturb a dispersion state of the pigment in the ink, wherein
  the ink further contains a resin particle, a water-soluble resin, and at least one surfactant selected from fluorinated surfactants and silicone surfactants,
  a content of the surfactant in the ink is 2% by mass or more and 8% by mass or less based on a total mass of the ink, and
  a content of the water soluble resin in the ink is 1% by mass or more and 10% by mass or less based on a total mass of the ink,
  a mass ratio of a content of the water-soluble resin in the ink to the content of the surfactant is 0.3 or more and 3.0 or less
  the water-soluble resin contains a unit derived from an unsaturated carboxylic acid and has an acid value of 90 mg KOH/g or less.

6. The image-recording method according to claim 1, wherein the water-soluble resin has an acid value of 40 mg KOH/g or more and 90 mg KOH/g or less.

7. The image-recording method according to claim 1, wherein the resin particle is a polyolefin, a polystyrene, a polyurethane, a polyester, a polyether, a polyurea, a polyamide, a polyvinyl alcohol, a poly(meth)acrylic acid and a poly(meth)acrylic acid salt, a polyalkyl (meth)acrylate and a polydiene, or a copolymer that are combinations thereof.

8. The image-recording method according to claim 1, wherein the content of the pigment in the ink is 0.2% by mass or more and 15.0% by mass or less based on the total mass of the ink.

9. The image-recording method according to claim 1, wherein the ink contains an aqueous medium which is water or a mixture of water and a water-soluble organic solvent.

10. The image-recording method according to claim 1, wherein the aqueous medium contains water, and the content of the water in the ink is 40% by mass or more and 95% by mass or less based on the total mass of the ink.

11. The image-recording method according to claim 1, wherein the water-soluble resin has a solubility of 1 g/L or more in water at 25° C.

12. An image-recording method comprising applying an ink containing a pigment to a recording medium and applying a liquid composition to the recording medium to at least partially overlap an area where the ink is applied, the liquid composition configured to disturb a dispersion state of the pigment in the ink, wherein
  the ink further contains a resin particle, a water-soluble resin, and at least one surfactant selected from fluorinated surfactants and silicone surfactants,
  a content of the surfactant in the ink is 2% by mass or more and 8% by mass or less based on a total mass of the ink,
  a content of the water soluble resin in the ink is 1% by mass or more and 10% by mass or less based on a total mass of the ink,
  a mass ratio of a content of the water-soluble resin in the ink to the content of the surfactant is 0.3 or more and 3.0 or less,
  the water-soluble resin has an acid value of 40 mg KOH/g or more and 300 mg KOH/g or less.

13. The image-recording method according to claim 12, wherein the content of the surfactant in the ink is 3% by mass or more based on the total mass of the ink.

14. The image-recording method according to claim 12, wherein the surfactant is represented by general formula (1):

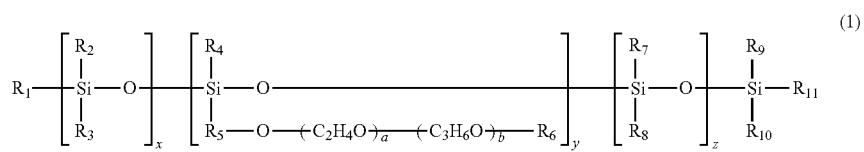

wherein $R_1$ to $R_4$ and $R_6$ to $R_{11}$ independently represent a hydrogen atom or a monovalent organic group, $R_5$ represents a divalent organic group, x, y, and "a" independently represent an integer of 1 or more, and z and b independently represent an integer of 0 or more.

15. The image-recording method according to claim 12, wherein the liquid composition contains an organic acid.

16. The image-recording method according to claim 12, wherein the content of the pigment in the ink is 0.2% by mass or more and 15.0% by mass or less based on the total mass of the ink.

17. The image-recording method according to claim 12, wherein the ink contains an aqueous medium which is water or a mixture of water and a water-soluble organic solvent.

18. The image-recording method according to claim 12, wherein the aqueous medium contains water, and the content of the water in the ink is 40% by mass or more and 95% by mass or less based on the total mass of the ink.

19. The image-recording method according to claim 12, wherein the water-soluble resin has a solubility of 1 g/L or more in water at 25° C.

20. The image-recording method according to claim 12, wherein the resin particle is a polyolefin, a polystyrene, a polyurethane, a polyester, a polyether, a polyurea, a polyamide, a polyvinyl alcohol, a poly(meth)acrylic acid and a poly(meth)acrylic acid salt, a polyalkyl (meth)acrylate and a polydiene, or a copolymer that are combinations thereof.

* * * * *